United States Patent
Anderson

(10) Patent No.: US 10,469,187 B2
(45) Date of Patent: Nov. 5, 2019

(54) SYSTEMS AND METHODS FOR DETECTING PASSIVE INTER-MODULATION (PIM) INTERFERENCE IN CELLULAR NETWORKS

(71) Applicant: Keysight Technologies, Inc., Minneapolis, MN (US)

(72) Inventor: Alan Anderson, Scotland (GB)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/678,477

(22) Filed: Aug. 16, 2017

(65) Prior Publication Data

US 2019/0058534 A1    Feb. 21, 2019

(51) Int. Cl.
| | | |
|---|---|---|
| *H04W 4/00* | (2018.01) | |
| *H04B 17/345* | (2015.01) | |
| *H04W 24/08* | (2009.01) | |
| *H04B 17/14* | (2015.01) | |

(52) U.S. Cl.
CPC .......... *H04B 17/345* (2015.01); *H04B 17/14* (2015.01); *H04W 24/08* (2013.01)

(58) Field of Classification Search
CPC .............................. H04B 17/345; H04W 24/08
See application file for complete search history.

(56) References Cited

U.S. PATENT DOCUMENTS

| | | | |
|---|---|---|---|
| 5,946,359 A | * 8/1999 | Tajiri | H03C 3/40 329/304 |
| 8,983,454 B2 | 3/2015 | Bevan et al. | |
| 9,668,268 B2 | 5/2017 | Lindoff et al. | |
| 9,693,364 B2 | 6/2017 | Gale et al. | |
| 2004/0052319 A1* | 3/2004 | Wakamatsu | H04L 27/2656 375/343 |
| 2010/0322296 A1* | 12/2010 | Lam | H04L 25/022 375/222 |
| 2011/0195673 A1* | 8/2011 | Pratt | H04B 1/52 455/78 |
| 2012/0086813 A1* | 4/2012 | Fimoff | H04L 25/022 348/192 |

(Continued)

FOREIGN PATENT DOCUMENTS

| | | |
|---|---|---|
| EP | 3035063 A1 | 6/2016 |
| WO | 2014/085345 A1 | 6/2014 |

OTHER PUBLICATIONS

UK Search Report dated Jan. 16, 2019, 3 pgs.

(Continued)

*Primary Examiner* — Clemence S Han

(57) ABSTRACT

A system and method for detecting passive intermodulation (PIM) interference in cellular networks are provided that do not require the base station or any sectors of it to be taken offline, that eliminate the need for a technician to make a visit to the cellular site to perform PIM testing, that enable multiple uplink connections to be remotely tested simultaneously, that enable cellular networks to be tested that do not have an accessible connection point to the RF chain, and that enable gradually deteriorating performance due to PIM interference and intermittent PIM interference problems to be detected.

19 Claims, 10 Drawing Sheets

(56) References Cited

U.S. PATENT DOCUMENTS

| | | | |
|---|---|---|---|
| 2013/0310023 A1* | 11/2013 | Bevan | H04B 1/1027 |
| | | | 455/423 |
| 2015/0087242 A1 | 3/2015 | Bain et al. | |
| 2016/0285487 A1 | 9/2016 | Noest et al. | |
| 2017/0126337 A1* | 5/2017 | Schwab | H04B 3/46 |
| 2017/0181174 A1 | 6/2017 | Lindoff et al. | |
| 2018/0070254 A1* | 3/2018 | Hannan | H04B 17/0085 |

OTHER PUBLICATIONS

W. X. Zhang et al., "Estimation of Frequency Response and Intermodulation Distortion From Bispectra", Proc of IEEE Workshopon Higher-Order Spectral Analysis, Jun. 28-30, 1989, pp. 30-35.

\* cited by examiner

SYSTEMS AND METHODS FOR DETECTING PASSIVE INTER-MODULATION (PIM) INTERFERENCE IN CELLULAR NETWORKS

BACKGROUND

Passive Inter-Modulation (PIM) interference has been a problem in cellular networks since their inception. A PIM interference problem occurs when energy from a transmission in one frequency band leaks into another frequency band, resulting in interference. It typically occurs where a high-power transmitter at the cellular site that is transmitting signals over the air to mobile devices (i.e., in the downlink direction) on one frequency band is located physically very close to a sensitive receiver at the cellular site that is receiving signals transmitted over the air by mobile devices (i.e., in the uplink direction). In an ideal world, the uplink and downlink transmission would not affect one another because they use different frequency bands. However, in the real world, a small leakage of energy from the downlink transmission into the uplink transmission can occur that completely drowns out any legitimate communication to the base station from a user's mobile device.

There are many causes of PIM interference, but the causes are generally electrically non-linear elements in the radio frequency (RF) pathway that occur unintentionally. Examples of causes include, for example, corroded connectors, poor quality cables, joints between two dissimilar metals, moisture, etc., that act (unintentionally) as electronically non-linear elements in the RF chain. In the multi-carrier systems and networks that underpin both four generation (4G) and many emerging fifth generation (5G) wireless standards, such electrically non-linear elements cause different frequency components that are present in the downlink and uplink signals to mix and multiply with one another, producing new frequency components. These new frequency components result in PIM interference, both inside and outside of the allocated frequency bands.

FIG. 1 illustrates a block diagram of a traditional cellular site 2 for which existing PIM test solutions are used to perform PIM testing. The existing PIM test solutions typically involve a technician visiting the cellular site 2 to perform PIM testing, taking a sector or an entire base station 3 offline, connecting a test instrument 4 to connection points of a transmitter 6 and a receiver 7 of the base station 3, using the test instrument 4 to inject a high-power signal into the RF path of the transmitter 6, and taking measurements with the test instrument 4 to determine whether any energy from the injected high-power signal has leaked into the RF path of the receiver 7. A coaxial cable 8 connects the base station 3 to one or more antennas 9 disposed on the top of a tower 11. The RF path or chain of the cellular site 2 includes the transmitter 6, the receiver 7, the coaxial cable 8, the antenna 9, and any RF connectors or other components disposed in the electrical pathway between the transmitter 6 and the antenna 9 or between the antenna 9 and the receiver 7. Any electrical nonlinearities along the RF path can result in PIM interference problems.

The disadvantages of the typical PIM test solution are that it requires taking sectors or the entire base station 3 offline and thereby disrupting service and that the costs associated with having a technician visit the cellular site 2 is very expensive. Other disadvantages include limitations on the number of uplink connections that can be analyzed, the inability to detect gradually deteriorating performance without having to make multiple visits to the celluar site, and the possibility of not detecting PIM interference that is intermittent and not present at the time of the visit. For example, moisture may enter on RF connector when it rains, leading to a PIM interference problem, but the PIM interference problem may dissappear when the moisture evaporates. Consequently, the PIM interference may only be detactable by a technician immediately after a rain event before the moisture has evaporated.

Yet another disadvantage is that all-digital cellular sites that do not have an accessible connection point for the test instrument cannot be tested using the typical PIM test solution. FIG. 2 illustrates a block diagram of an all-digital cellular site 12, which may be, for example, a Common Public Radio Interface (CPRI) cellular site. With an all-digital cellular site of this type, a data center 13, sometimes referred to as a baseband pool or a baseband hotel, communicates via an optical fiber link 14 with the tower 15 of the site. The data center 13 may serve multiple all-digital cellular sites (not shown) and is typically remotely located relative to the locations of the cellular sites, e.g., ten to twenty kilometers away from the cellular sites. The optical fiber link 14 often runs to the top of the tower 15 or part way up the tower 15 before interfacing with optical-to-electrical conversion equipment and the RF chain (i.e., transmitter, receiver, power amplifiers, coaxial cables, etc.). The box 16 represents the optical-to-electrical conversion equipment and the RF chain, which is electrically coupled to the antenna 17, typically with coaxial cable (not shown). In such networks, typical PIM testing solutions such as those described above are unsuitable for performing PIM testing because there is no accessible connection point for interfacing the test equipment with the RF chain.

A need exists for a system and method for detecting PIM interference in cellular networks that do not require the base station or any sectors to be taken offline to perform PIM testing, that eliminate the need for a technician to make a visit the cellular site, that can test multiple uplink connections simultaneously, that can be used to test all-digital cellular sites that do not have an accessible connection point to the RF chain, and that can detect gradually deteriorating performance due to PIM interference and intermittent PIM interference problems.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
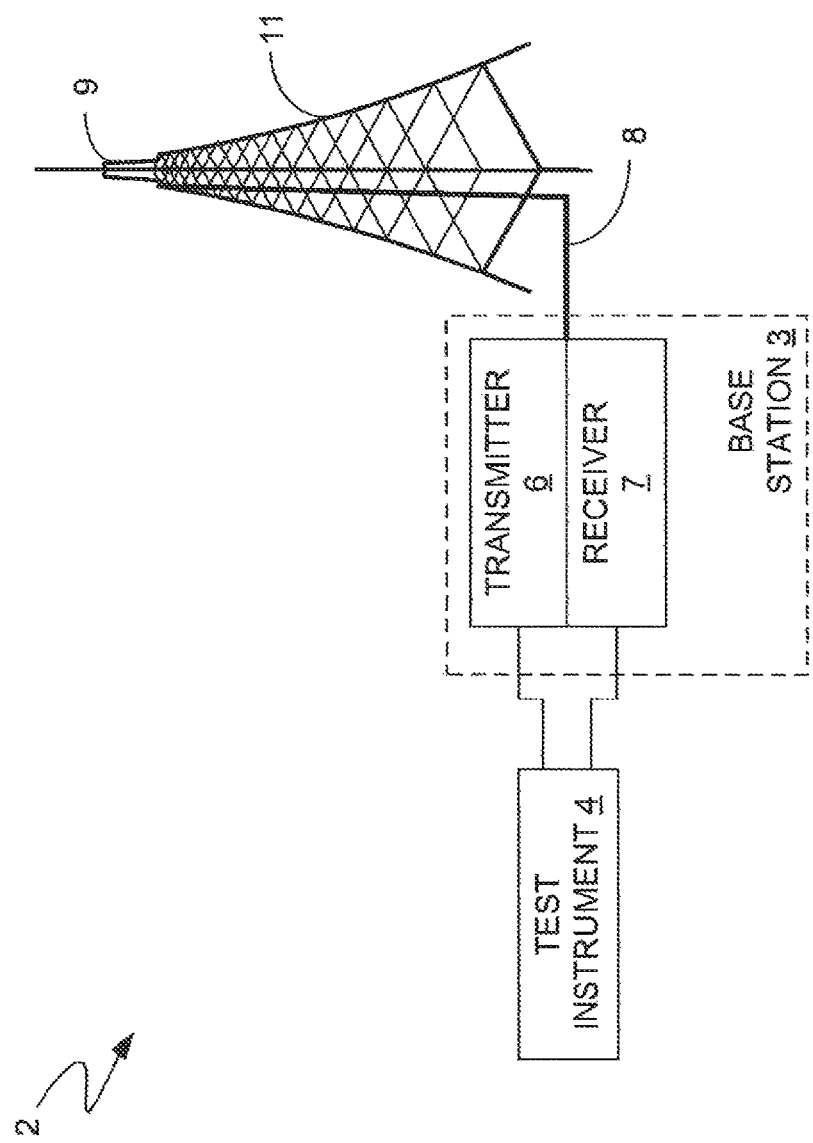
FIG. 1 illustrates a block diagram of a traditional cellular site for which existing PIM test solutions are used to perform PIM testing.
Figure 2:
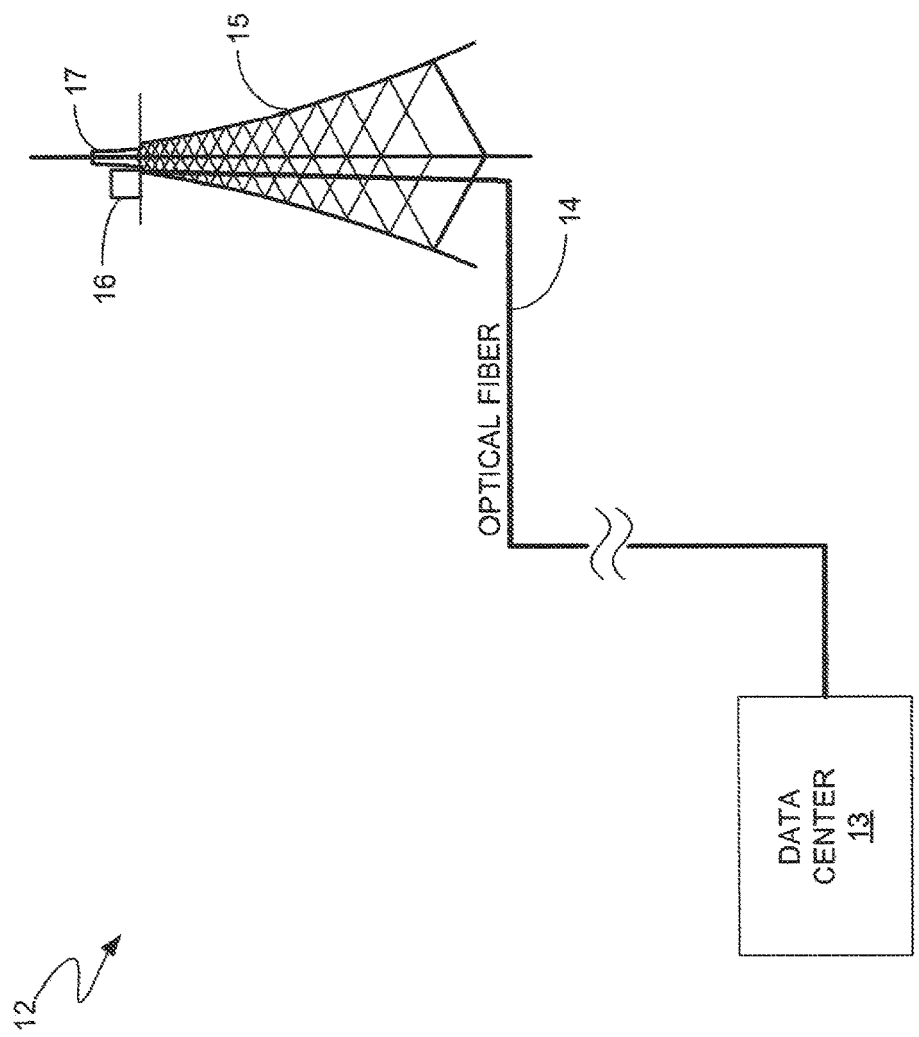
FIG. 2 illustrates a block diagram of an all-digital cellular site, which may be, for example, a Common Public Radio Interface (CPRI) cellular site.

Representative embodiments disclosed herein are directed to a system and method for detecting PIM interference in cellular networks that do not require the base station or any sectors of it to be taken offline, that eliminate the need for a technician to make a visit to the cellular site, that enable multiple uplink connections to be remotely tested simultaneously, that enable cellular networks to be tested that do not have an accessible connection point to the RF chain, and that enable gradually deteriorating performance due to PIM interference and intermittent PIM interference problems to be detected. The system captures first and second sets of digital baseband in phase (I) and quadrature phase (Q) samples from signals communicated in downlink and uplink directions, respectively, from a transmitter of a base station to a first mobile device and from the first mobile device to a receiver of the base station, respectively, using first and second carrier frequencies, respectively, that are different from one another. The first and second sets of digital baseband I and Q samples are stored in memory of the system. Processing logic of the system executes a comparison algorithm that performs that compares the first and second sets of digital baseband I and Q samples to determine whether energy associated with the first set of digital baseband I and Q samples has leaked into the second set of digital baseband I and Q samples.

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a non-transitory computer-readable storage medium that is capable of storing computer instructions, or computer code, for execution by one or more processors. Memory may also store various types of data, which is of particular focus of the inventive principles and concepts discussed herein. References herein to "memory" or "memory device" should be interpreted as one or more memories or memory devices. The memory may, for example, be multiple memories within the same computer system. The memory may also be multiple memories distributed amongst multiple computer systems or computing devices.

A "processor" or "processing logic," as those terms are used herein, encompass an electronic component that is able to execute a computer program or executable computer instructions. References herein to a system comprising "a processor" or "processing logic" should be interpreted as a system having one or more processors or processing cores. The processor or processing logic may, for instance, be a multi-core processor. A processor or processing logic may also refer to a collection of processors within a single computer system or distributed amongst multiple computer systems. The term "computer," as that term is used herein, should be interpreted as possibly referring to a single computer or computing device or to a collection or network of computers or computing devices, each comprising one or more processors or one or more instances of processing logic. Instructions of a computer program can be performed by a single computer, processor, multiple processors, processing logic or multiple instances of processing logic that may be within the same computer or that may be distributed across multiple computers.

Figure 3:
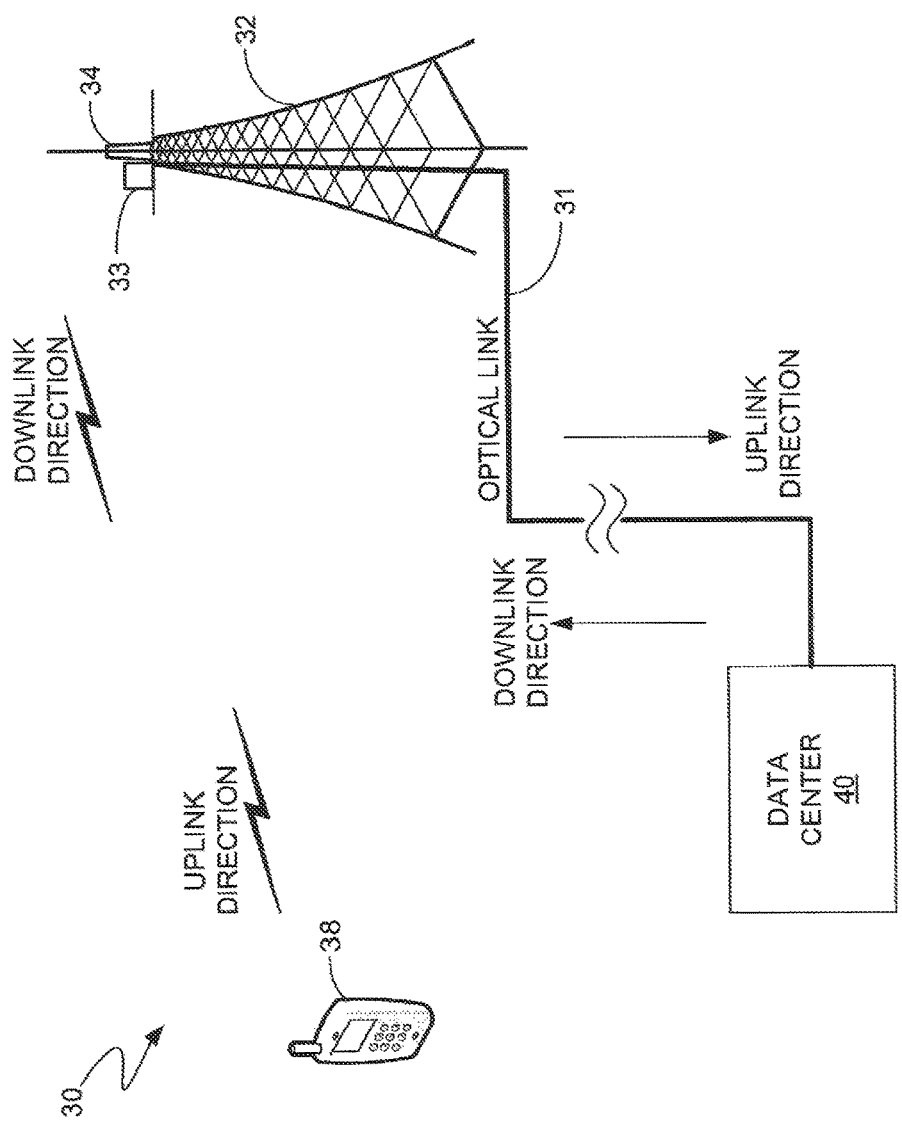
FIG. 3 illustrates a block diagram of an all-digital cellular site that incorporates the system and method for detecting PIM interference in accordance with a representative embodiment.

FIG. 3 illustrates a block diagram of an all-digital cellular site 30 that incoporates the system and method for detecting PIM interference in accordance with a representative embodiment. The all-digital cellular site 30 may be, for example, a CPRI cellular site. The term "all-digital cellular site," as that term is used herein, denotes a cellular site in which information to be transmitted in the uplink direction and information received in the downlink direction is communicated between a data center and a tower of the cellular site in the form of digital baseband I and Q signals over an optical link, which is typically an optical fiber link. As indicated above, with such all-digital cellular sites, there may not be a connection point, or at least not a readily accessible connection point, for interfacing a traditional PIM test instrument (e.g., a spectrum analyzer) with the RF chain. The system and method are particularly well suited for performing PIM testing in such systems because the system and method do not require an interface to the RF chain of the cellular site. It should be noted, however, that the system and method described herein may be used to perform PIM testing at cellular sites that do have such accessible connection points, although they are not needed.

The all-digital cellular site 30 has a data center 40, which may also be thought of as a baseband pool, a baseband hotel or a base station, that communicates via an optical link 31 with the tower 32 of the cellular site 30. The data center 40 may serve multiple all-digital cellular sites (not shown) and may be remotely located relative to the locations of the cellular sites, e.g., ten to twenty kilometers away from the cellular sites. As indicated above, in all-digital cellular sites, the optical fiber link often runs to the top of the tower or part way up the tower before interfacing with optical-to-electrical conversion equipment and the RF chain (i.e., transmitter, receiver, power amplifiers, coaxial cables, etc.). Box 33 represents the optical-to-electrical conversion equipment and the RF chain, which is electrically coupled to the antenna 34, typically with coaxial cable (not shown). For exemplary purposes, it will be assumed that the RF chain begins at the top of the tower 32 beside the antenna 34, but in other embodiments, the interface of the RF chain and the optical link 31 is at some other location in the cellular site 30.

It should be noted that while the inventive principles and concepts are being described with reference to their use in an all-digital cellular site, the inventive principles and concepts can be used to perform PIM testing at any type of cellular site, as will be understood by persons of skill in the art in view of the description being provided herein.

In the downlink direction, i.e., transmssions from the data center 40 to a user's mobile device 38, the data center 40 sends digital baseband I and Q signals over the optical link 31 to the optical-to-electrical conversion circuitry (not shown), which converts the optical signals into electrical baseband I and Q signals. The electrical baseband I and Q signals are delivered to the transmitter (not shown) of the RF chain. Box 33 represents the optical-to-electrical conversion circuitry and the RF chain. The transmitter uses the electrical baseband I and Q signals to modulate a first carrier frequency to generate RF data signals having the first carrier frequency, which are transmitted by the antenna 34 over the air to the user's mobile device 38.

In the uplink direction, i.e., transmissions from the user's mobile device 38 over the air to the antenna 34, RF data signals having a second carrier frequency that is different from the first carrier frequency are transmitted over the air from the user's mobile device 38 to the antenna 34. The receiver (not shown) of the RF chain 33 receives the RF data signals and demodulates them into electrical baseband I and Q signals. The electrical baseband I and Q signals are converted into digital optical baseband I and Q signals and communicated over the optical link 31 to the data center 40. At the data center, the digital optical baseband I and Q signals are converted into digital electrical baseband I and Q samples, which are then processed in accordance with the inventiv principles and concepts described herein to determine whether any of the energy of the RF data signals transmitted by the antenna 34 over the air in the downlink direction to the user's mobile device 38 using the first carrier frequency leaked into the transmissions from the user's mobile device 38 over the air in the uplink direction to the antenna 34 using the second carrier frequency. If a determination is made that any such leakage occurred, then this is an indication that PIM interference has been detected. A representative embodiment of the system that performs PIM testing to make these determinations will now be described with reference to FIG. 4.

Figure 4:
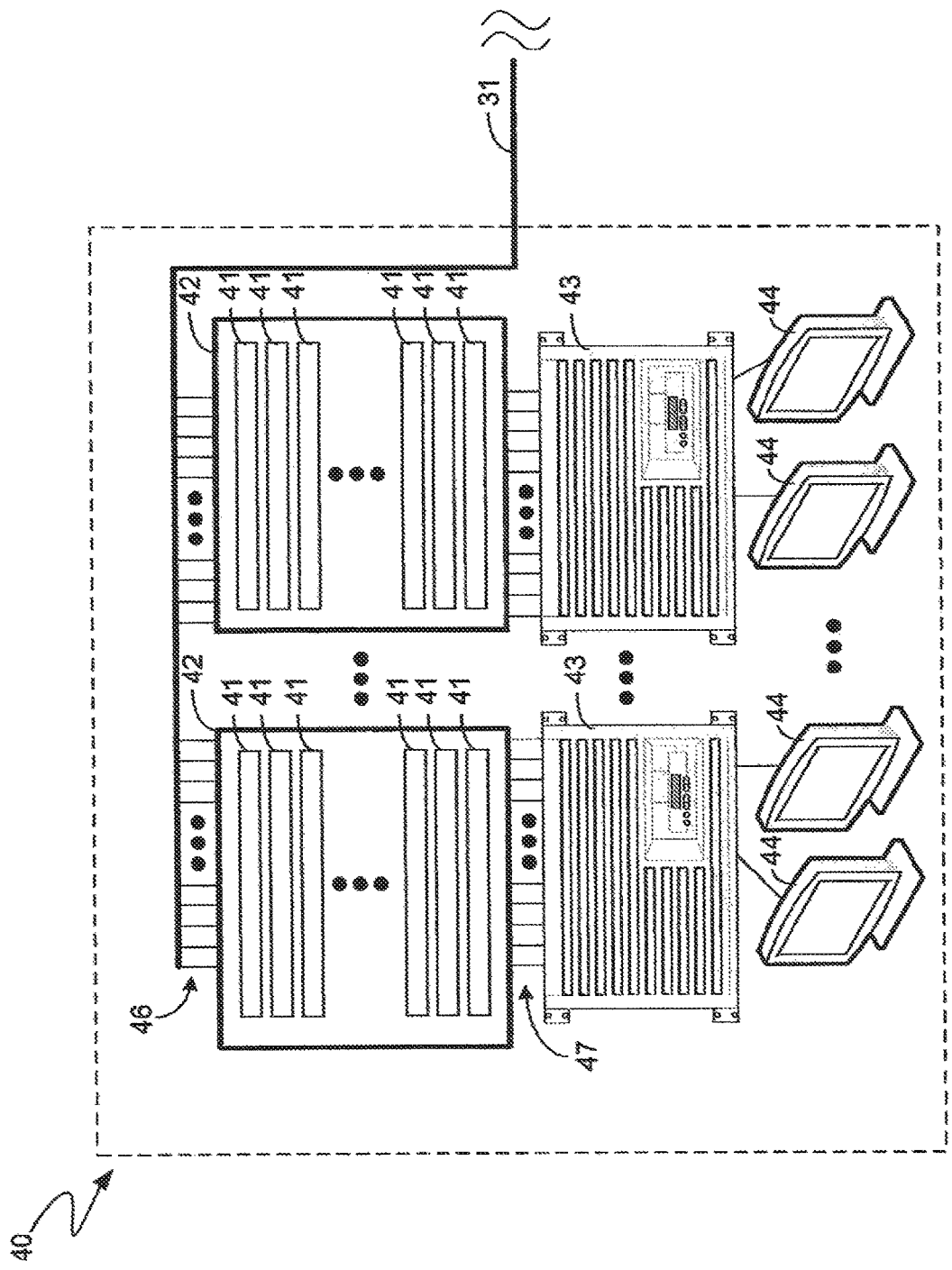
FIG. 4 illustrates a block diagram of the data center shown in FIG. 3 in accordance with a representative embodiment that incorporates the system and method for detecting PIM interference.
Figure 5:
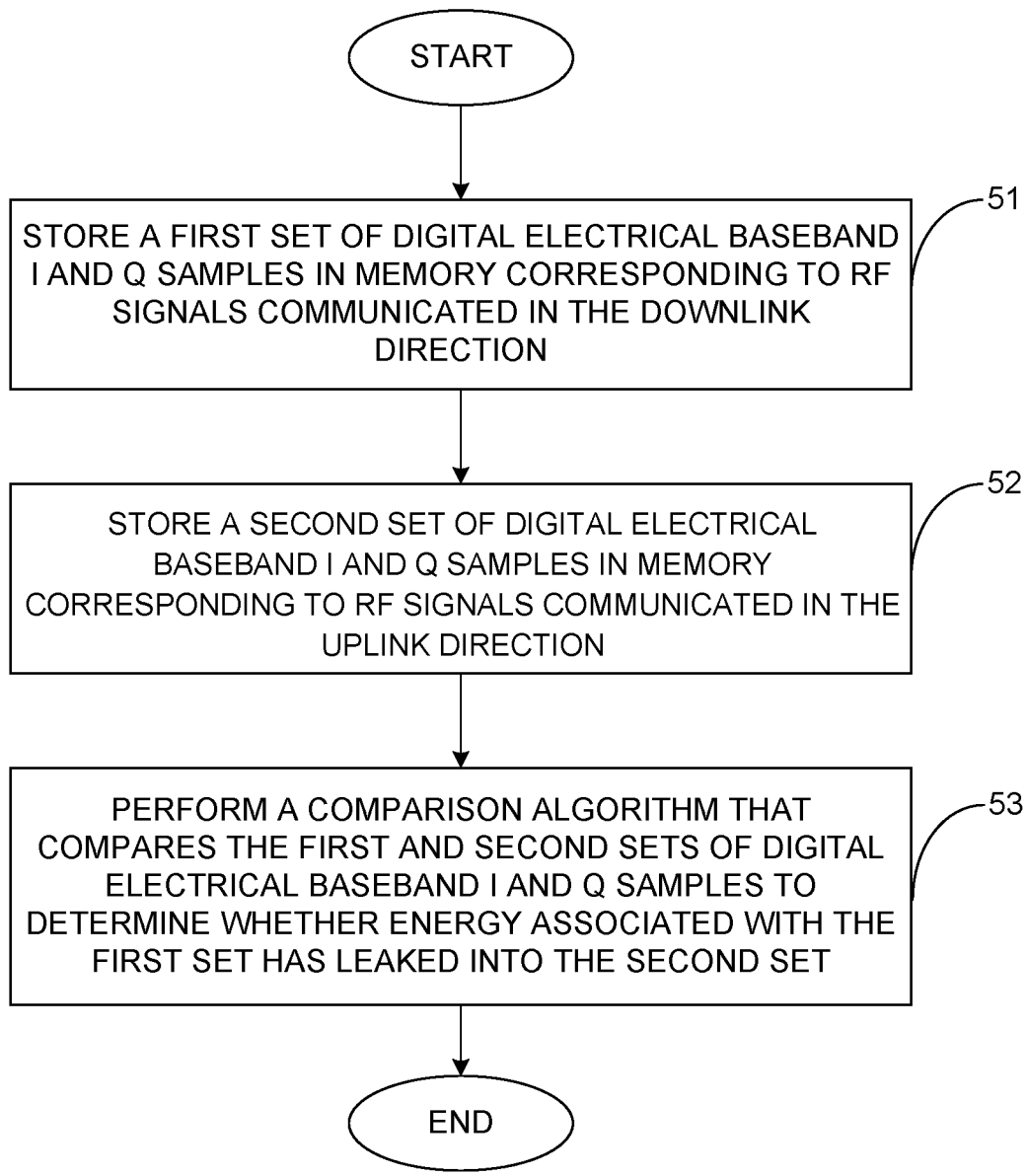
FIG. 5 is a flow diagram that represents the PIM interference detection method in accordance with an embodiment performed by the servers shown in FIG. 4.

FIG. 4 illustrates a block diagram of the data center 40 shown in FIG. 3 in accordance with a representative embodiment that incorporates the system and method for detecting PIM interference. The data center 40 has a plurality of optical transceiver modules 41 that are mounted in racks 42, a plurality of servers 43 that are electrically coupled to the optical transceiver modules 41, and a plurality of display devices 44 that are electrically coupled with the servers 43. In accordance with this representative embodiment, the servers 43 have processing logic (not shown) that performs a PIM detection algorithm to determine whether energy from communications transmitted in the downlink direction from the data center 40 to the user's mobile device 38 has leaked into communications transmitted in the uplink direction from the user's mobile device 38 to the data center 40. FIG. 5 is a flow diagram that represents the PIM interference detection method in accordance with an embodiment performed by the servers 43. The PIM interference detection method will now be described with reference to FIGS. 3-5.

The optical link 31 typically comprises a plurality of optical fibers 46, which may be any suitable optical fibers including single-mode or multi-mode optical fibers. Proximal ends of the optical fibers 46 are coupled with the optical transceiver modules 41 and distal ends of the optical fibers 46 are coupled with the optical-to-electrical conversion circuitry or with the electrical-to-optical conversion circuitry disposed at the location on the tower 32 represented by box 33. In the downlink direction of communications, the optical transceiver modules 41 output digital optical baseband I and Q signals onto the optical fibers 46 that are carried over the optical link 31 to the tower 32. The optical-to-electrical conversion circuitry (box 33) converts the digital optical baseband I and Q values into digital electrical baseband I and Q values that the RF chain uses to modulate carrier waves of the first carrier frequency to generate RF data signals that are transmitted over the air by the antenna 34 to mobile devices of users. For convenience, a single user's mobile device 38 is shown in FIG. 3, although it will be understood that the cellular site 30 services multiple users' mobile devices.

In the uplink direction, the antenna 34 receives RF data signals transmitted by the user's mobile device 38 using the second carrier frequency. The RF chain at the location represented by box 33 demodulates the RF data signals into analog electrical signals and converts the analog electrical signals into digital electrical baseband I and Q values. Electrical-to-optical conversion circuitry at the location represented by box 33 converts the digital electrical baseband I and Q values into digital optical baseband I and Q values and couples the digital optical baseband I and Q values onto the optical fibers 46 of the optical link 31. The digital optical baseband I and Q values are carried over the optical link 31 to the data center 40.

At the data center 40, the processing logic (not shown) inside of one or more of the servers 43 stores in memory (not shown) of the server 43 a first set of digital electrical baseband I and Q samples corresponding to the digital optical baseband I and Q signals that were transmitted in the downlink direction. The step of storing the first set of digital electrical baseband I and Q samples in memory is represented by block 51 in the flow diagram shown in FIG. 5. In the uplink direction, one of the optical transceiver modules 41 receives the digital optical baseband I and Q values sent over the optical link 31 and converts them into a second set digital electrical baseband I and Q samples, which are then output over an electrical interface 47 to one of the servers 43. The server 43 receives the second set of digital optical baseband I and Q samples and stores it in the memory (not shown) of the server 43. The step of storing the second set of digital electrical baseband I and Q samples in memory is represented by block 52 in the flow diagram shown in FIG. 5. Processing logic (not shown) of the server 43 performs a comparison algorithm that compares the first and second sets of digital electrical baseband I and Q samples with one another to determine whether any energy associated with the first set has leaked into the second set, as indicated by block 53 in FIG. 5.

The process represented by the flow diagram of FIG. 5 can be performed without taking the cellular site 30 offline. Thus, the process can be performed while the cellular site 30 is online performing normal downlink operations during which RF signals are transmitted to mobile devices and while performing normal uplink operations during which RF signals are received from mobile devices. The process can also be performed by multiple servers 43 simultaneously, with each server 43 executing an instance of the PIM interference detection algorithm. For example, assuming the cellular site 30 has N transmit (Tx) antennas, $Tx_1$-$Tx_N$, and has M receive (Rx) antennas $Rx_1$-$Rx_M$, where N and M are positive integers that are greater than or equal to one, a first one of the servers 43 may be performing the comparison algorithm to determine whether any energy associated with communications that are being transmitted by antenna $Tx_1$ is leaking into communications received by any of antennas $Rx_1$-$Rx_M$. Similarly, a second one of the servers 43 may be performing the comparison algorithm to determine whether any energy associated with communications that are being transmitted by antenna $Tx_2$ is leaking into communications received by any of antennas $Rx_1$-$Rx_M$. This would be particularly advantageous in cellular sites that implement multiple input, multiple output (MIMO) technology. This process may be repeated until a determination has been made as to whether any communication via any of the antennas $Tx_1$-$Tx_N$ has leaked into any of the communications received by any of the antennas $Rx_1$-$Rx_M$.

Whenever the process detects PIM interference leakage, a variety of additional steps may be taken. For example, the server 43 may generate a report, issue an audible and/or visual warning, send a message to a site operator, etc. Such a report, warning or message may identify the Tx antenna that transmitted the downlink communication that resulted in leakage and Rx antenna that received the uplink communication that contained the leaked energy. Identifying the Tx and Rx antenna pair will assist a technician or enginner in performing further investigation to determine the source of the PIM interference.

A variety of comparison algorithms are suitable for performing the process depicted in the flow diagram of FIG. 5. A cross-correlation function is a well-known mathematical function that is particularly well suited for use as the comparison algorithm. In the interest of brevity, because the manner in which cross-correlation operations may be performed is well known in the art of signal processing, the manner in which cross-correlation operations are performed to make the determination represented by block 53 of FIG. 5 will not be described herein.

Figure 6:
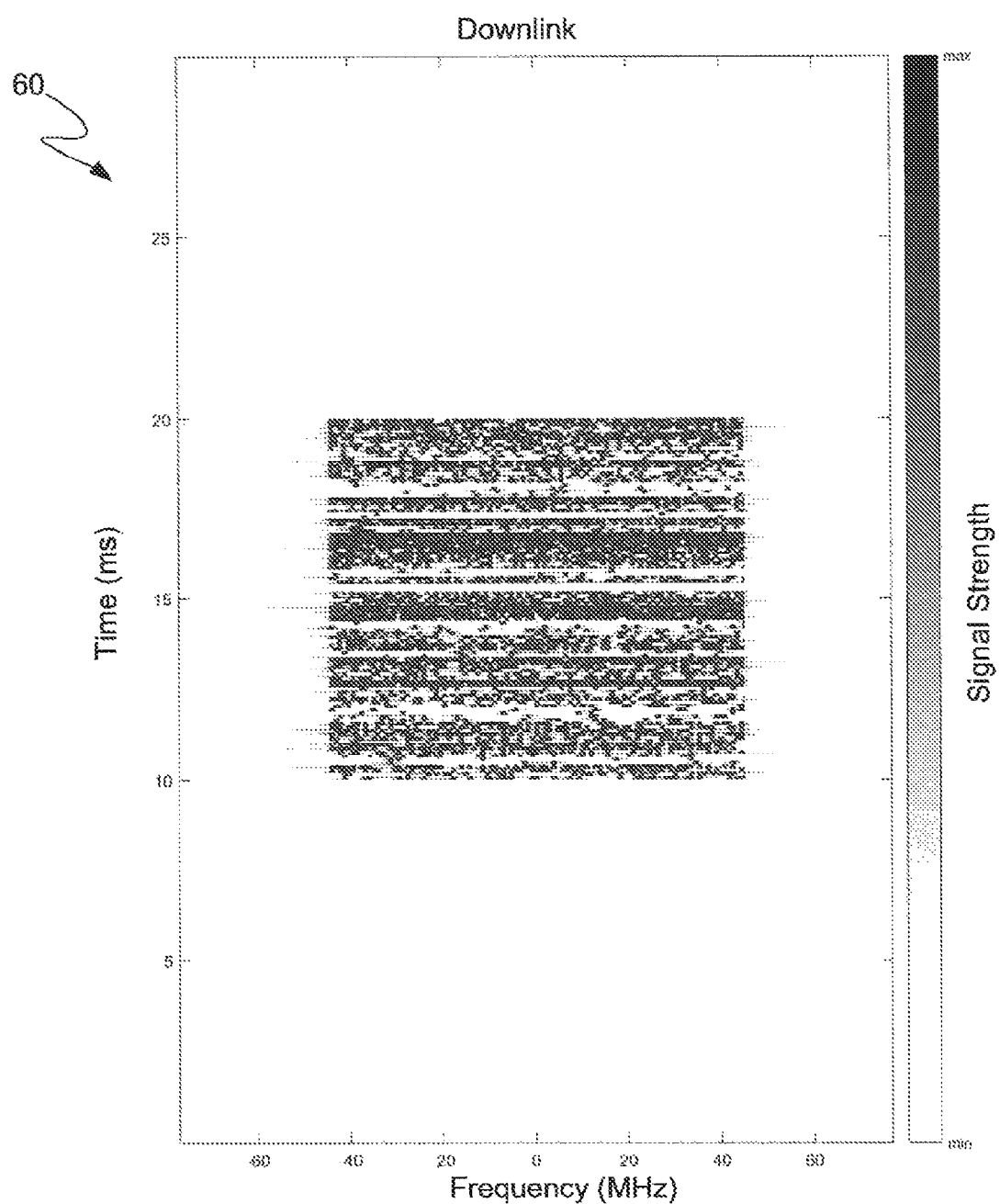
FIGS. 6 and 7 are spectrograms corresponding to first and second communications, respectively, sent in the downlink and uplink directions, respectively, using first and second carrier frequencies, respectively, and which demonstrate leakage of energy from the communication sent in the downlink direction into the communication sent in the uplink direction.
Figure 7:
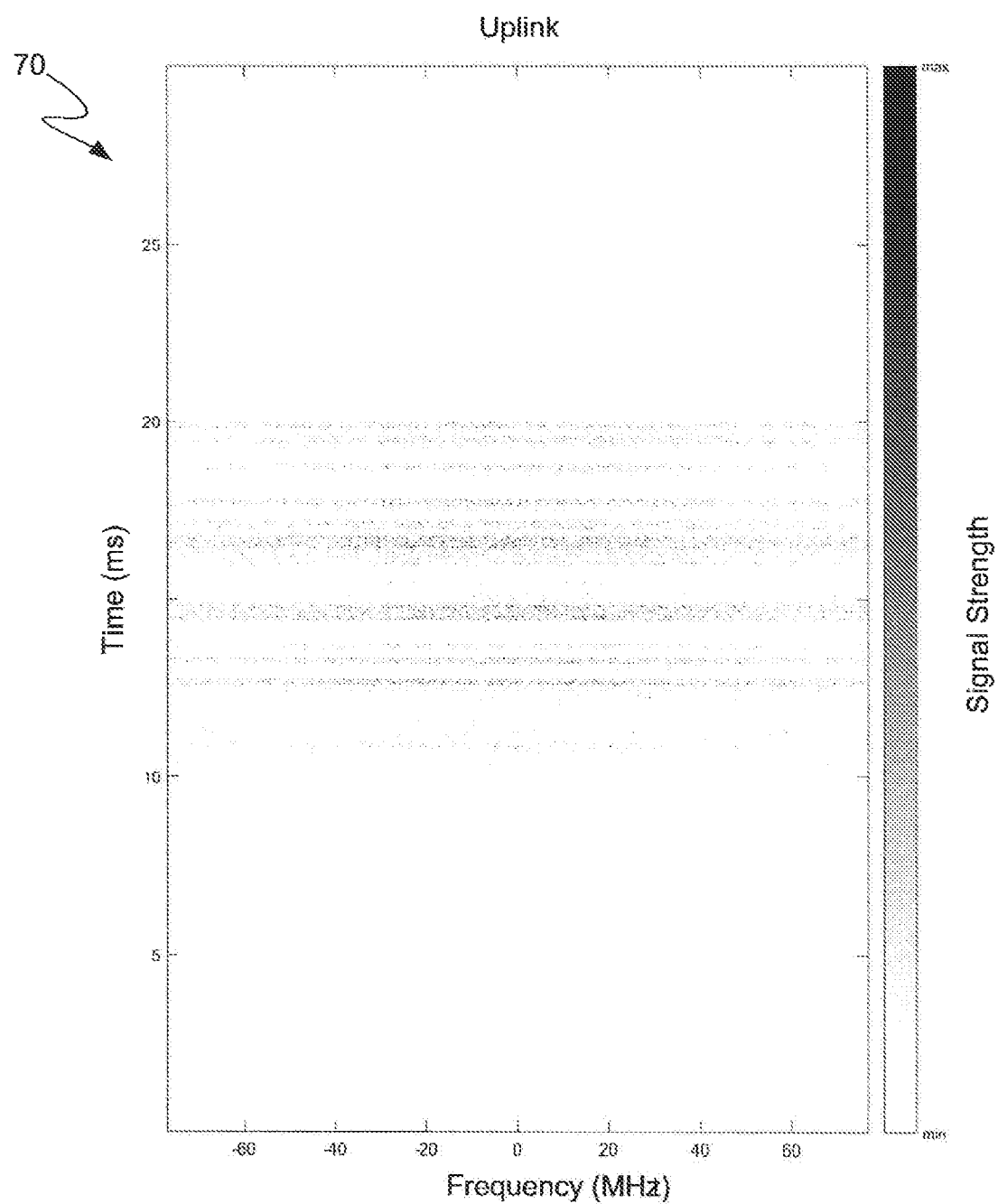

FIGS. 6 and 7 are spectrograms 60 and 70, respectively, corresponding to first and second communications, respectively, in the downlink and uplink directions, respectively, using first and second carrier frequencies, respectively. These spectrograms demonstrate leakage of energy from the communication sent in the downlink direction into the communication sent in the uplink direction. The spectrogram 60 shows a normal downlink signal with a data burst being sent in a 10 millisecond (ms) window, while the other shows the corresponding uplink spectrum suffering from PIM interference from the first downlink signal, as well as normal background noise. In an ideal system, there should be no detectable signal in the uplink spectrogram 70 caused by the downlink communication. However, the spectrogram 70 shows a visible leaking of energy into the uplink in this example because nothing is being communicated in the uplink direction in this example.

A technician (not shown) can visually display the spectrograms 60 and 70 on one of the display devices 44 shown in FIG. 4 to visually determine based on spectrograms whether a PIM interference problem exists even without the server 43 performing the comparison algorithm, but performance of the comparison algorithm represented by the flow diagram of FIG. 5 allows this process to be automated and to be used to differentiate between legitimate uplink communications from users and PIM interference.

For exemplary purposes, FIGS. 6 and 7 depict a case where there is no uplink traffic in order to clearly demonstrate the inventive principles and concepts. It should be noted, however, that the presence of uplink traffic does not pose a problem to performing the PIM detection method because uplink traffic will not correlate with downlink traffic in the absence of PIM interference leakage.

Figure 8:
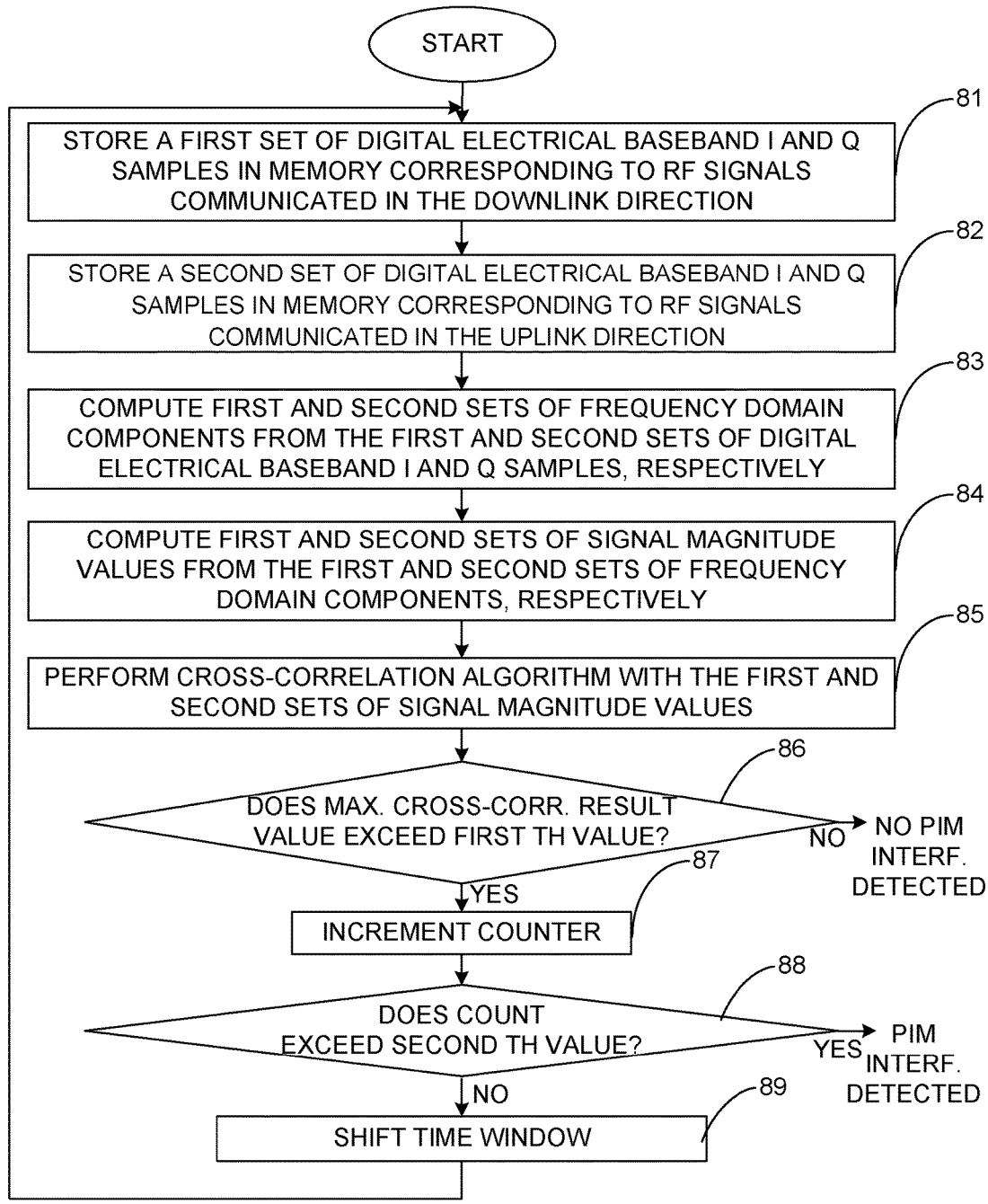
FIG. 8 is a flow diagram of the PIM interference detection method in accordance with a representative embodiment in which the comparison algorithm is a cross-correlation algorithm.

FIG. 8 is a flow diagram of the PIM interference detection method in accordance with a representative embodiment in which the comparison algorithm is a cross-correlation algorithm. Blocks 81 and 82 represent steps that are identical to the steps represented by blocks 51 and 52, respectively, in FIG. 5. Block 83 represents the process of computing first and second sets of frequency domain components from the first and second sets of digital electrical baseband I and Q samples, respectively. The first and second sets of frequency domain components are typically computed by performing a Fourier transformation process, such as a fast Fourier transformation (FFT) process, on the first and second sets of digital electrical baseband I and Q samples, respectively, although other time domain-to-frequency domain conversion processes may be used for this purpose. Block 84 represents the process of computing first and second sets of signal magnitude values from the first and second sets of frequency domain components, respectively. Block 85 represents the process of performing a cross-correlation function that cross-correlates the first and second sets of signal magnitude values with one another to produce a set of cross-correlation result values.

Figure 9:
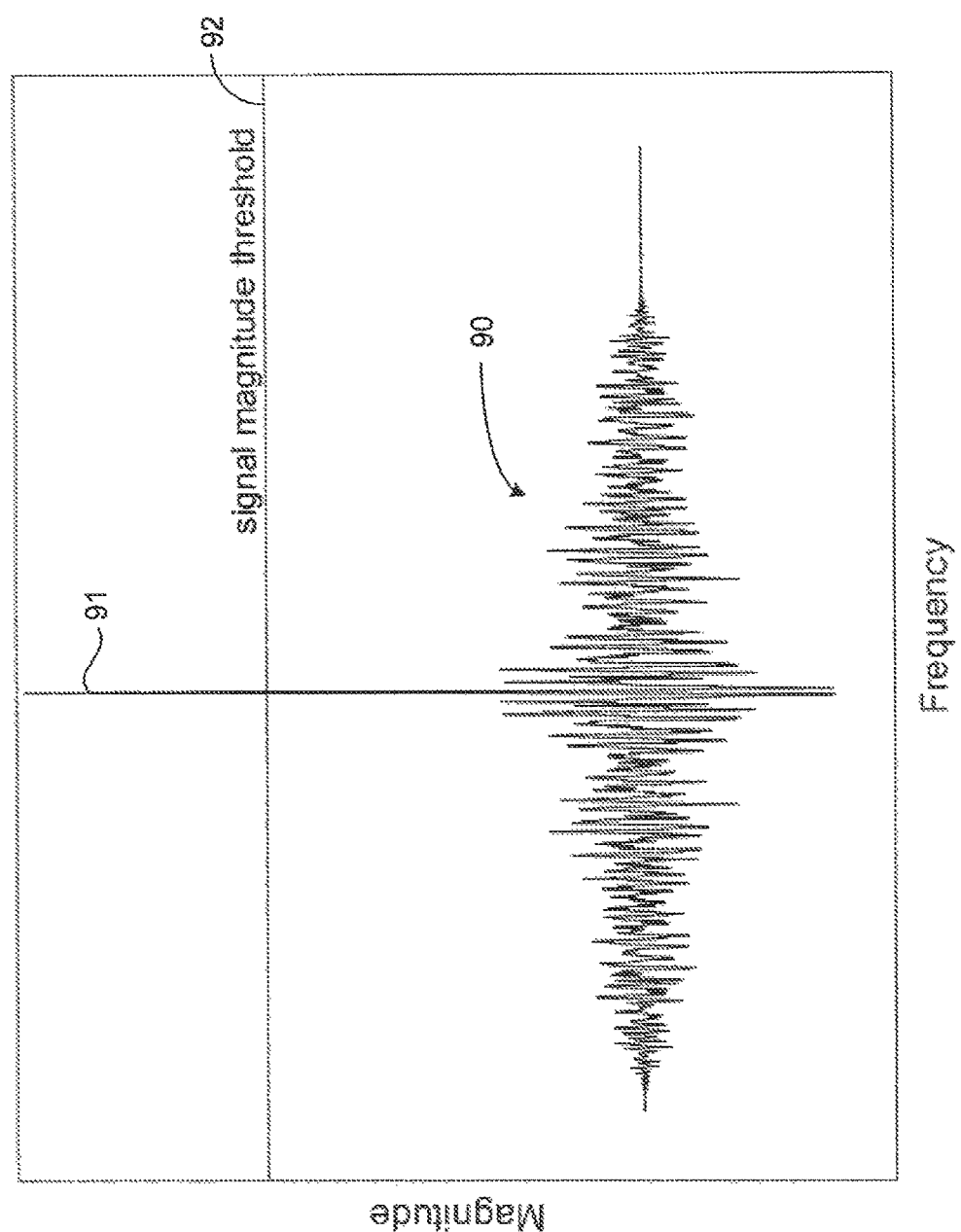
FIG. 9 is a graphical illustration of a waveform corresponding to a frequency domain representation of the set of cross-correlation result values obtained in the step represented by block 85 of FIG. 8.

FIG. 9 is a graphical illustration of a waveform 90 corresponding to frequency domain representation of the set of cross-correlation result values obtained by cross-correlating the first and second sets of signal magnitude values with one another in the manner in the step represented by block 85. The magnitude peak 91 is indicative of a strong correlation between the first and second sets of signal magnitude values, which is indicative of the leakage of PIM interference from the downlink transmission into the uplink transmission. The absence of a readily discernible magnitude peak is indicative of weak correlation or no correlation between the first and second sets of signal magnitude values. A first predetermined threshold (TH) value 92 is used to determine whether the maximum cross-correlation result value, i.e., the peak value, is sufficiently great to indicate that PIM interference leakage has occurred.

With reference again to FIG. 8, once the set of cross-correlation result values has been computed, the maximum cross-correlation result value is compared to the first predetermined TH value described above with reference to FIG. 9 and a determination is made as to whether the maximum cross-correlation result value exceeds the first predetermined TH value, as indicated by block 86. If it is determined that the maximum cross-correlation result value does not exceed the first predetermined TH value, then this indicates that PIM interference has not been detected. If it is determined that the maximum cross-correlation result value exceeds the first predetermined TH value, then this is an indication that PIM interference has been detected. The fact that a single maximum cross-correlation result value exceeds the first predetermined TH value may be insufficient to decide that PIM interference has been detected due to the possibility of errors leading to false positives. In order to avoid such false positives, it is desirable to perform the process represented by blocks 81-86 for multiple adjacent instants of time or multiple adjacent time windows. Blocks 87-89 represent additional steps that preferably are taken to ensure that such false positives do not lead to a determination that PIM interference leakage has been detected.

With reference to block 87, when a decision is made at block 86 that the maximum cross-correlation result value exceeds the first predetermined TH value, a counter is incremented. A determination is then made at block 88 as to whether the count exceeds a second predetermined TH value. If so, this means that PIM interference has been detected at block 86 over a predetermined number of adjacent time windows that exceeds the second predetermined TH value. The second predetermined Th value is set sufficiently large to rule out false positives. If a determination is made at block 88 that the count does not exceed the second predetermined Th value, then the time window for which the process represented by blocks 81-88 is performed is shifted to an adjacent time window, as indicated by block 89. The process then returns to block 81.

The process represented by blocks 81-89 can be performed periodically or continuously. A determination made at block 88 that the count exceeds the second TH value can result in some action being taken, such as the issuance of a warning that PIM interference leakage has been detected that identifies the antenna(s) that were transmitting and receiving in the downlink and uplink directions, respectively.

The process of shifting the time window can simply mean processing the samples that were acquired, or captured, during the adjacent time window. In the example described above with reference to FIG. 4, all of these samples are typically already stored in memory inside of the servers 43, and therefore the process represented by block 89 can be simply obtaining the samples that were acquired and stored during an adjacent time window.

Figure 10:
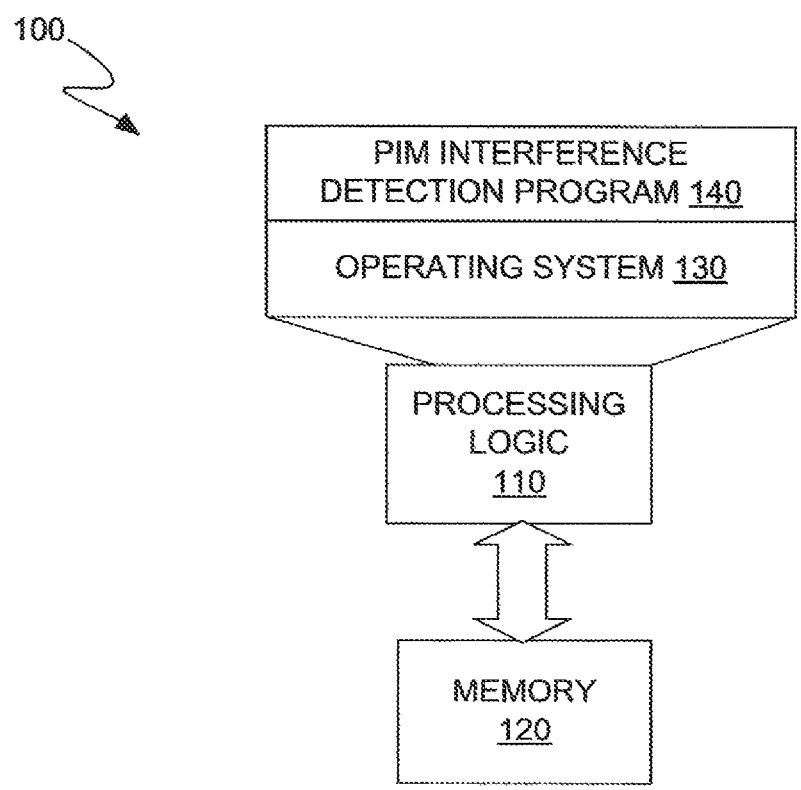
FIG. 10 illustrates a block diagram of a computer system that may be within one of the servers shown in FIG. 4 and that executes a PIM interference detection program in accordance with an embodiment.

FIG. 10 illustrates a block diagram of a computer system 100 that may be, but need not be, within one of the servers 43 shown in FIG. 4. For demonstrative purposes, it will be assumed that the computer system 100 is within one of the servers 43. The computer system 100 comprises processing logic 110 and memory 120 configured to perform the processes described above with reference to FIGS. 5 and 8. The processing logic 110 runs an operating system (OS) 130 that controls the operations of the processing logic 110, such as writing data to and reading data from memory 120. The processing logic 110, under control of the OS 130, executes a PIM interference detection software program 140 that performs the algorithm described above with reference to FIGS. 5 and 8. During performance of the PIM interference detection program 140, the processing logic 110 stores a first set of digital electrical I and Q baseband samples corresponding to the digital optical I and Q baseband signals that were transmitted in the downlink direction in memory 120. The computer system 100 can be operative to continuously run the PIM interference detection program 140 on one or more of the servers 43 such that a copy of the digital I and Q baseband values associated with every downlink communication is saved in the respective memory 120 of the server 43.

In the uplink direction, the optical transceiver modules 41 receive the digital optical I and Q baseband values sent over the optical link 31 and convert them into respective second sets of digital electrical I and Q baseband samples, which are then output over the electrical interface 47 to the respective servers 43. The processing logic 110 of the respective server 43 receives the second set of digital optical I and Q baseband samples and stores the second set of digital electrical I and Q baseband samples in memory 120. The processing logic 110 executing the PIM interference detection program 140 performs the process described above with reference to FIGS. 8 and 9 to determine whether any PIM interference associated with the first set has leaked into the second set.

The PIM interference detection program 140 comprises computer instructions, or code, that may be software, firmware, or a combination of software and firmware. The computer instructions are stored, or embodied, on a non-transitory computer-readable medium, such as, for example, memory 120 or some other memory device that is in communication with the processing logic 110. A variety of non-transient computer-readable mediums are suitable for this purpose, including, for example, solid state storage devices, magnetic storage devices and optical storage devices. For example, the memory devices may be implemented by any number, type and combination of random access memory (RAM), which may include any number, type and combination of computer readable storage media, such as a disk drive, non-volatile solid state memories such as NAND, NOR and other new types of non-volatile memory such as phase change or other new non-volatile technologies, a writeable CD, a writeable DVD, a writeable universal serial bus (USB) drive, and the like, which are non-transitory (e.g., as compared to transitory propagating signals) and capable of being configured as storage devices.

It should be noted that while the PIM interference detection method has been described herein as being performed at the data center 40, it may be performed at any location that is capable of intercepting the uplink and downlink digital I and Q baseband streams. The location at which interception occurs can be, but need not be, a remote location relative to the cellular site.

Because the PIM interference detection program 140 can run continuously or with high frequency, PIM interference problems that are intermittent or that are indicative of a deteriorating component in the RF path can be detected. In addition PIM interference detection can be performed without having to inject a signal into the RF path and without having to send a technician to the cellular site.

While the invention has been illustrated and described in detail in the drawings and foregoing description, such illustration and description are to be considered illustrative or exemplary and not restrictive. The invention is not limited to the disclosed embodiments. For example, a variety of modifications may be made to the computer system 100 shown in FIG. 8 while still achieving the inventive principles and goals, as will be understood by those of skill in the art in view of the description provided herein. Likewise, a variety of modifications may be made to the process depicted in FIG. 5 while still achieving the inventive principles and goals, as will be understood by those of skill in the art in view of the description provided herein. Other variations to the disclosed embodiments can be understood and effected by those skilled in the art in practicing the claimed invention, from a study of the drawings, the disclosure, and the appended claims.

What is claimed is:

1. A computer system for detecting passive intermodulation (PIM) interference in a cellular site, the computer system comprising:
memory configured to store first and second sets of digital baseband in phase (I) and quadrature phase (Q) samples captured over multiple adjacent time windows, the first set of digital baseband I and Q samples being used by a transmitter of the cellular site to transmit an RF signal having a first carrier frequency in a downlink direction, the second set of digital baseband I and Q samples being obtained from an RF signal having a second carrier frequency received by a receiver of the cellular site in an uplink direction, the second carrier frequency being different from the first carrier frequency; and
processing logic configured to execute a comparison algorithm that, for the multiple adjacent time windows:
converts the first and second sets of digital baseband I and Q samples from a time domain into first and second sets of frequency domain components, respectively;
computes first and second sets of signal magnitude values from the first and second sets of frequency domain components, respectively;
performs a cross-correlation algorithm with the first and second sets of signal magnitude values to produce a set of cross-correlation result values;
compares a maximum of the set of cross-correlation result values to a first predetermined maximum cross-correlation threshold (TH) value to determine whether or not the maximum of the cross-correlation result values exceeds the first predetermined maximum cross-correlation TH value, and when so, increments a counter; and
determines whether a count of the counter exceeds a second predetermined maximum cross-correlation TH value, and when so, decides that PIM interference has been detected.

2. The computer system of claim 1, wherein the computer system is operative to detect PIM interference while the cellular site is online performing normal downlink operations during which RF signals are transmitted to mobile devices and while performing normal uplink operations during which RF signals are received from mobile devices.

3. The computer system of claim 1, wherein the computer system is remote relative to the cellular site.

4. The computer system of claim 1, wherein the computer system is operative to continuously monitor RF signals transmitted in the uplink and downlink directions to detect PIM interference that is intermittent or that is indicative of a deteriorating component.

5. The computer system of claim 1, wherein the computer system is operative to detect PIM interference without injecting a signal into circuitry of the cellular site.

6. The computer system of claim 1, wherein the cellular site is an all-digital cellular site that does not have a readily accessible connection point for interfacing a test instrument with an RF chain of the cellular site.

7. The computer system of claim 1, wherein the computer system is located at a data center that is in communication with a tower of the cellular site via an optical link, and wherein the first and second sets of digital baseband I and Q samples are carried from the data center to the transmitter and from the receiver to the data center, respectively, via the optical link.

8. A data center in communication with a transmitter and with a receiver of a cellular site, the transmitter being configured to use a first set of digital electrical baseband I and Q samples received from the data center to modulate a first carrier frequency to transmit a radio frequency (RF) signal in a downlink direction, the receiver being configured to receive and demodulate an RF signal sent to the data center in an uplink direction to generate a second set of digital electrical baseband I and Q samples, the data center comprising:
a first server comprising:
a first memory that stores the first and second sets of digital electrical baseband I and Q samples captured over multiple adjacent time windows; and
first processing logic configured to execute a comparison algorithm that, for the multiple adjacent time windows:
converts the first and second sets of digital baseband I and Q samples from a time domain into first and second sets of frequency domain components, respectively;
computes first and second sets of signal magnitude values from the first and second sets of frequency domain components, respectively;
performs a cross-correlation algorithm with the first and second sets of signal magnitude values to produce a set of cross-correlation result values;
compares a maximum of the cross-correlation result values to a first predetermined maximum cross-correlation threshold (TH) value to determine whether or not the maximum of the cross-correlation result values exceeds the first predetermined maximum cross-correlation TH value, and when so, increments a counter; and
determines whether a count of the counter exceeds a second predetermined maximum cross-correlation TH value, and when so, decides that PIM interference has been detected.

9. The data center of claim 8, wherein the cellular site is an all-digital cellular site that does not have a readily accessible connection point for interfacing a test instrument with an RF chain of the cellular site.

10. The data center of claim 9, wherein the data center is in communication with a tower of the all-digital cellular site via an optical link, and wherein the first set of digital electrical baseband I and Q samples is obtained by converting a first set of digital optical baseband I and Q samples that are carried from the data center to the transmitter via the optical link into the first set of digital electrical baseband I and Q samples, and wherein the second set of digital electrical baseband I and Q samples are converted into a second set of digital optical baseband I and Q samples that is carried over the optical link to the data center and converted back into the second set of digital electrical baseband I and Q samples that are stored in the first memory.

11. The data center of claim 8, wherein the comparison algorithm is a cross-correlation algorithm that cross-correlates the first set of digital electrical baseband I and Q samples with the second set of digital electrical baseband I and Q samples to determine whether energy associated with the first set of digital electrical baseband I and Q samples has leaked into the second set of digital electrical baseband I and Q samples.

12. A method for detecting passive intermodulation (PIM) interference in a cellular site, the method comprising:
storing first and second sets of digital baseband in phase (I) and quadrature phase (Q) samples captured over multiple adjacent time windows, wherein the first set of digital baseband I and Q samples is used by a transmitter of the cellular site to transmit an RF signal having a first carrier frequency in a downlink direction from the cellular site to a mobile device, wherein the second set of digital baseband I and Q samples are obtained from an RF signal having a second carrier frequency received by a receiver of the cellular site from a mobile device in an uplink direction, the second carrier frequency being different from the first carrier frequency; and
with processing logic, executing a comparison algorithm that, for the multiple adjacent time windows:
converts the first and second sets of digital baseband I and Q samples from a time domain into first and second sets of frequency domain components, respectively;
computes first and second sets of signal magnitude values from the first and second sets of frequency domain components, respectively;
performs a cross-correlation algorithm with the first and second sets of signal magnitude values to produce a set of cross-correlation result values;
compares a maximum of the cross-correlation result values to a first predetermined threshold (TH) value to determine whether or not the maximum of the cross-correlation result values exceeds the first predetermined maximum cross-correlation TH value, and when so, increments a counter; and
determines whether a count of the counter exceeds a second predetermined maximum cross-correlation TH value, and when so, decides that PIM interference has been detected.

13. The method of claim 12, wherein the method is performed while the cellular site is online performing normal downlink operations during which RF signals are transmitted to mobile devices and while performing normal uplink operations during which RF signals are received from mobile devices.

14. The method of claim 12, wherein the processing logic is remote relative to the cellular site.

15. The method of claim 12, wherein the method is performed continuously or frequently to detect PIM interference that is intermittent or that is indicative of a deteriorating component.

16. The method of claim 12, wherein the method is capable of detecting PIM interference without injecting a signal into circuitry of the cellular site.

17. The method of claim 12, wherein the cellular site is an all-digital cellular site that does not have a readily accessible connection point for interfacing a test instrument with an RF chain of the cellular site.

18. The method of claim 17, wherein the comparison algorithm is a cross-correlation algorithm that cross-correlates the first set of digital baseband I and Q samples with the second set of digital baseband I and Q samples to determine whether energy associated with the first set of digital baseband I and Q samples has leaked into the second set of digital baseband I and Q samples.

19. A computer program comprising computer instructions for execution by one or more processors for detecting passive intermodulation (PIM) interference in a cellular site, the computer program being embodied on a non-transitory computer-readable medium, the computer program comprising:
a first set of instructions that stores first and second sets of digital baseband in phase (I) and quadrature phase (Q) samples in memory captured over multiple adjacent time windows, wherein the first set of digital baseband I and Q samples is used by a transmitter of the cellular site to transmit a radio frequency (RF) signal having a first carrier frequency in a downlink direction from the cellular site to a mobile device, wherein the second set of digital baseband I and Q samples are obtained from an RF signal having a second carrier frequency received by a receiver of the cellular site from a mobile device in an uplink direction, the second carrier frequency being different from the first carrier frequency;
a second set of instructions that converts the first and second sets of digital baseband I and Q samples from a time domain into first and second sets of frequency domain components, respectively;
a third set of instructions that computes first and second sets of signal magnitude values from the first and second sets of frequency domain components, respectively;
a fourth set of instructions that performs a cross-correlation algorithm with the first and second sets of signal magnitude values to produce a set of cross-correlation result values;
a fifth set of instructions that compares a maximum of the cross-correlation result values to a first predetermined threshold (TH) value to determine whether or not the maximum of the cross-correlation result values exceeds the first predetermined maximum cross-correlation TH value, and when so, increments a counter; and
a sixth set of instructions that determines whether a count of the counter exceeds a second predetermined maximum cross-correlation TH value, and when so, decides that PIM interference has been detected.

* * * * *